United States Patent
Wong

(10) Patent No.: US 9,075,831 B2
(45) Date of Patent: Jul. 7, 2015

(54) METHOD AND APPARATUS FOR MODIFYING A ROW IN A DATABASE TABLE TO INCLUDE META-DATA

(75) Inventor: Daniel ManHung Wong, Sacramento, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1285 days.

(21) Appl. No.: 11/391,033

(22) Filed: Mar. 28, 2006

(65) Prior Publication Data

US 2007/0239743 A1    Oct. 11, 2007

(51) Int. Cl.
*G06F 17/00*    (2006.01)
*G06F 17/30*    (2006.01)

(52) U.S. Cl.
CPC .... *G06F 17/30289* (2013.01); *G06F 17/30365* (2013.01); *G06F 17/30377* (2013.01); *G06F 17/30348* (2013.01); *G06F 17/30368* (2013.01)

(58) Field of Classification Search
None
See application file for complete search history.

(56) References Cited

U.S. PATENT DOCUMENTS

| | | | | |
|---|---|---|---|---|
| 5,133,068 A * | 7/1992 | Crus et al. | | 707/100 |
| 6,820,082 B1 * | 11/2004 | Cook et al. | | 707/9 |
| 7,069,263 B1 * | 6/2006 | Yee et al. | | 707/3 |
| 7,249,140 B1 * | 7/2007 | Korenevsky et al. | | 707/102 |
| 2004/0034619 A1 * | 2/2004 | Lu et al. | | 707/1 |
| 2005/0131966 A1 * | 6/2005 | Lou | | 707/204 |
| 2005/0216465 A1 * | 9/2005 | Dutta et al. | | 707/9 |
| 2006/0041591 A1 * | 2/2006 | Rhoads | | 707/104.1 |
| 2007/0112866 A1 * | 5/2007 | Olson-Williams | | 707/200 |

* cited by examiner

*Primary Examiner* — Dung K Chau
(74) *Attorney, Agent, or Firm* — Shun Yao; Park, Vaughan, Fleming & Dowler LLP

(57) ABSTRACT

One embodiment of the present invention provides a database system that facilitates modifying a row in a database table to include meta-data about operations performed on the row. During operation, the database receives a command to perform an operation on a row in a table of the database. The database then determines if executing the command necessitates updating an extensible row descriptor for the row, wherein the extensible row descriptor is a field in the row that contains meta-data about operations performed on the row. If so, the database updates the extensible row descriptor in a manner defined by an update rule for the extensible row descriptor.

16 Claims, 5 Drawing Sheets

FIG. 2 [PRIOR ART]

| NAME | DEPARTMENT | SALARY | | | | | |
|------|------------|--------|---|---|---|---|---|
| SUE | MARKETING | 30K | | | | | |
| MARY | ENGINEERING | 85K | | | | | |
| ADAM | ACCOUNTING | 45K | | | | | |
| | | | | | | | |
| | | | | | | | |
| | | | | | | | |
| | | | | | | | |

FIG. 3

| NAME | DEPARTMENT | SALARY | EXTENSIBLE ROW DESCRIPTOR |
|------|------------|--------|---------------------------|
| SUE | MARKETING | 30K | {13579, JOHN} |
| MARY | ENGINEERING | 85K | {02468, DANIEL} |
| ADAM | ACCOUNTING | 45K | {19375, ELLEN} |
| | | | {02468, DANIEL} |
| | | | |
| | | | |
| | | | |

METHOD AND APPARATUS FOR MODIFYING A ROW IN A DATABASE TABLE TO INCLUDE META-DATA

BACKGROUND

1. Field of the Invention

The present invention relates to databases. More specifically, the present invention relates to a method and an apparatus for modifying a row in a database to include meta-data.

2. Related Art

Database administrators and application developers often find the need to tag rows in database tables with information related to the rows. For example, an administrator may find it useful to know when data was inserted into a database table, or when a row in a database table was last updated. This information can serve various purposes, and is especially useful for facilitating auditing operations and performing security tasks.

One common method for tagging rows in a database table involves inserting an additional column into the database table. The additional column can be used to store any type of information related to rows in the table that an administrator or an organization may need. However, there is presently no easy way to ensure the integrity of the data in the additional column without a significant amount of additional effort. Any user who has access to the database table can alter the data in the additional column, which can cause security problems that can mitigate the benefits of using the additional column.

Hence, what is needed is a method for associating information with data in a database table without the above-mentioned problems.

SUMMARY

One embodiment of the present invention provides a database system that facilitates modifying a row in a database table to include meta-data about operations performed on the row. During operation, the database receives a command to perform an operation on a row in a table of the database. The database then determines if executing the command necessitates updating an extensible row descriptor for the row, wherein the extensible row descriptor is a field in the row that contains meta-data about operations performed on the row. If so, the database updates the extensible row descriptor in a manner defined by an update rule for the extensible row descriptor.

In a variation on this embodiment, the update rule can include a set of update rules.

In a variation on this embodiment, the extensible row descriptor can only be updated by the database, and cannot be modified by a user.

In a variation on this embodiment, the update rule can be defined by an owner of the table, or a super-user.

In a variation on this embodiment, the extensible row descriptor can contain any meta-data associated with operations performed on the row that is known by the database, or that can be obtained by the database via communication with a third-party system. This can include, but is not limited to, security attributes (such as a username of a user who last updated the row), a timestamp of the last update, the System Change Number (SCN) of the last update, or the application module that performed the last update.

In a variation on this embodiment, the operation can include an update operation, an insert operation, a delete operation, or a select operation.

In a variation on this embodiment, determining if the command necessitates updating an extensible row descriptor involves using an update rule to determine if the extensible row descriptor needs to be updated.

In a variation on this embodiment, the system creates the table by receiving a definition for the extensible row descriptor, receiving a definition for the update rule, and incorporating the extensible row descriptor and the update rule into the table while creating the table.

BRIEF DESCRIPTION OF THE FIGURES

FIG. 2 illustrates an existing database table.

FIG. 3 illustrates a database table with an extensible row descriptor in accordance with an embodiment of the present invention.

DETAILED DESCRIPTION

Figure 1:
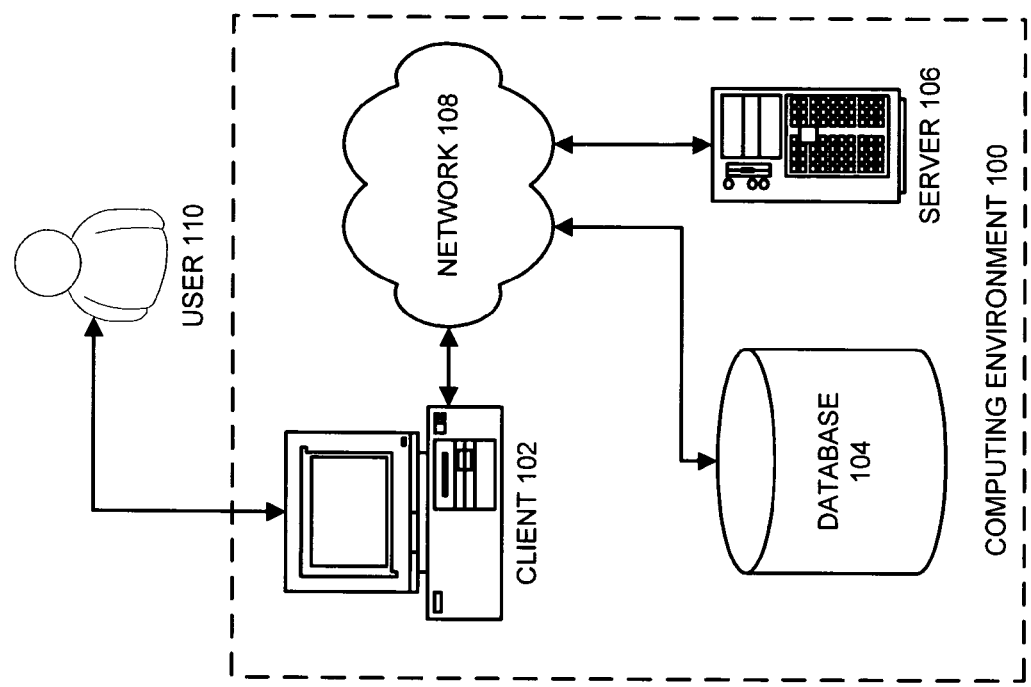
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), and DVDs (digital versatile discs or digital video discs).

Overview

One embodiment of the present invention teaches a method for tagging a row in a database with meta-data related to operations performed on the database row. Upon creation of a database table, the database receives an extensible row descriptor definition and an update rule definition. The extensible row descriptor is a column in the database table that a user, a super-user, or an administrator cannot modify. Only the database can modify the extensible row descriptor. Hence, the extensible row descriptor is a special column type that the database manages.

In one embodiment of the present invention, an attempt to issue a command that modifies the extensible row descriptor results in the failed attempt being recorded within the extensible row descriptor.

In one embodiment of the present invention, the update rule defines what information is stored in the extensible row descriptor. The update rule instructs the database on how to manage the extensible row descriptor column for the user. For example, the update rule can define when and how the extensible row descriptor can be updated.

In one embodiment of the present invention, a user can perform an operation, such as a SELECT operation, on the extensible row descriptor as long as the operation does not attempt to modify the extensible row descriptor.

In one embodiment of the present invention, the database does not require the definition of an extensible row descriptor. In this embodiment the extensible row descriptor is optional. However, if an extensible row descriptor is defined, then an update rule can also be defined.

In one embodiment of the present invention, the extensible row descriptor and/or the update rule is pre-defined by an administrator. In this embodiment, upon creation of a database table, the extensible row descriptor is automatically inserted into the database table.

In one embodiment of the present invention, the extensible row descriptor and the update rule are implemented as an extension to standard Structured Query Language (SQL) syntax.

Computing Environment

FIG. 1 illustrates a computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Computing environment 100 includes client 102, database 104, server 106, and network 108. Client 102 can communicate with database 104 and server 106 via network 108. User 110 can communicate directly with client 102.

Client 102 can generally include any node on a network including computational capability and including a mechanism for communicating across the network.

Database 104 can generally include any type of system for storing data in non-volatile storage. This includes, but is not limited to, systems based upon magnetic, optical, and magneto-optical storage devices, as well as storage devices based on flash memory and/or battery-backed up memory.

Server 106 can generally include any computational node including a mechanism for servicing requests from a client for computational and/or data storage resources.

Network 108 can generally include any type of wired or wireless communication channel capable of coupling together computing nodes. This includes, but is not limited to, a local area network, a wide area network, or a combination of networks. In one embodiment of the present invention, network 108 includes the Internet.

In one embodiment of the present invention, user 110 creates a new database table in database 104 via client 102. Database 104 then prompts user 110 to create an extensible row descriptor and an update rule for the new database table.

In one embodiment of the present invention, the update rule includes specifies that the database communicates with server 106 to obtain information that is used in updating the extensible row descriptor. This information can include, but is not limited to, the organization that the user is a member of, the security level of the user, and the employee identification number of the user. This embodiment facilitates the use of information that may be readily available in another system, but that is not internally available to database 104.

Existing Database Table

FIG. 2 illustrates an existing database table 200. Database table 200 is an example of an existing database table. Database table 200 represents a portion of an employee list. Note that in an environment where multiple users have permission to modify database table 200, user 110 can modify database table 200 without accountability because there is no way to know which user modified database table 200. One embodiment of the present invention solves this problem by recording which user modified database table 200 in an extensible row descriptor within the table, thus provides accountability for all database operations.

Database Table With Extensible Row Descriptor

FIG. 3 illustrates a database table 300 with an extensible row descriptor 302 in accordance with an embodiment of the present invention. Extensible row descriptor 302 can only be modified by the database in a manner defined by the update rule, and cannot be modified by a user. In one embodiment of the present invention, a super-user cannot modify the update rule.

Note that extensible row descriptor 302 can include any meta-data associated with an operation performed on the corresponding row. This can include, but is not limited to, security attributes (such as a username of a user who last updated the row), a timestamp of the last update, the System Change Number (SCN) of the last update, or the application module that performed the last update.

In one embodiment of the present invention, extensible row descriptor 302 can include multiple fields and/or columns.

In one embodiment of the present invention, each cell in the extensible row descriptor 302 column is defined to store the name and identification number of the last user who modified a particular row within database table 300. For example, cell 304 reveals that the last user to modify the first row in database table 300 was user "JOHN" whose identification number is "13579". If a problem is discovered in the information stored in the first row of database table 300, user "JOHN" will be consulted in an attempt to restore database table 300 to its proper state. However, if a discrepancy is found in conventional database table 200, it will be much more difficult, and perhaps impossible, to identify which user caused the problem found in database table 200.

In one embodiment of the present invention, deleting a row in database table 300 does not result in the deletion of the extensible row descriptor information as illustrated by cell 306. This is advantageous because it facilitates in determining when a row is improperly deleted.

In one embodiment of the present invention, deleting a row in database table 300 results in the deletion of the extensible row descriptor entry for the deleted row.

Update Rule

Figure 4:
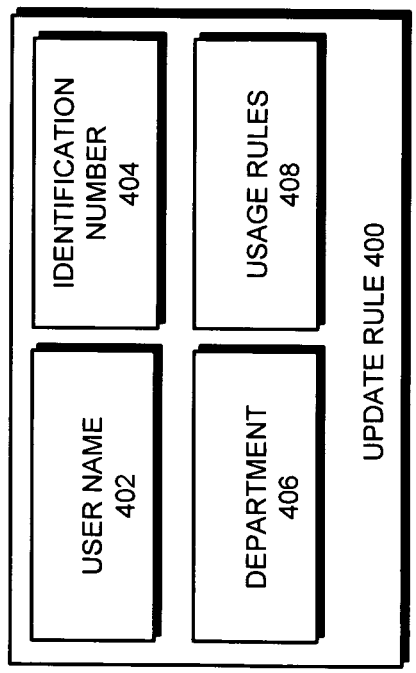
FIG. 4 illustrates an update rule in accordance with an embodiment of the present invention.

FIG. 4 illustrates an update rule 400 in accordance with an embodiment of the present invention. Update rule 400 specifies what information should be stored in the extensible row descriptor and defines the rules that should be used to update the extensible row descriptor. Update rule 400 includes user name 402, identification number 404, department 406, and usage rules 408. User name 402, identification number 404, and department 406 are all examples of possible fields that can be included as part of the value of the extensible row descriptor.

Usage rules 408 define when the extensible row descriptor should be updated. For example, usage rules 408 may specify that any command resulting in modification to a row in the database table should result in the updating of the extensible row descriptor with the information specified in update rule 400. Note that update rule 400 merely provides an example of one possible update rule. In general, update rule 400 is not limited to the fields illustrated in FIG. 4.

In one embodiment of the present invention, each row can have its own update rule.

In one embodiment of the present invention, update rule 400 can require information that is not stored within the database. In this embodiment, update rule 400 includes instructions and/or commands required to obtain the information that is stored externally to the database.

Row Modification

Figure 5:
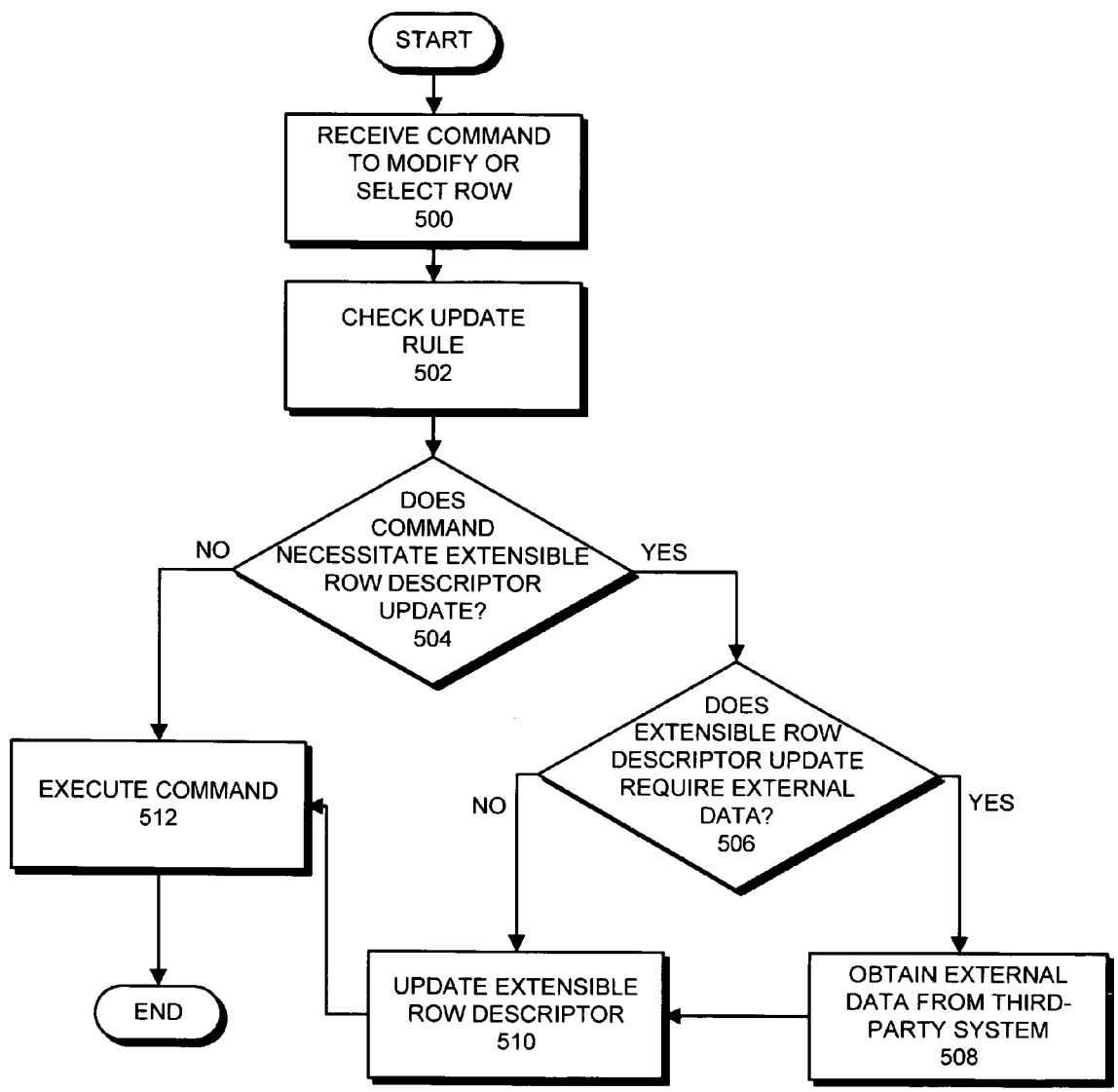
FIG. 5 presents a flowchart illustrating the row modification process in accordance with an embodiment of the present invention.

FIG. 5 presents a flowchart illustrating the row modification process in accordance with an embodiment of the present invention. The process begins when the system receives a command to modify or select a row in a database table (step 500). Note that if the command involves modifying the extensible row descriptor then the database will reject the command. The extensible row descriptor can only be modified by the database and not by a command issued by a user.

The system checks the update rule for the table and/or row that is to be selected or modified (step 502). Next, the system determines if the command necessitates an update of the extensible row descriptor (step 504). The system then determines if an update of the extensible row descriptor is necessary by referring to the rules that were defined in the update rule for the particular table and/or row in question. If an update of the extensible row descriptor is not necessary, the system executes the command (step 512). However, if an update of the extensible row descriptor is necessary, the system determines if the update of the extensible row descriptor requires data that is stored externally to the database (step 506). If not, the system updates the extensible row descriptor following the usage rules defined in the update rule (step 510). The system then executes the command (step 512).

On the other hand, if the system does require external data to update the extensible row descriptor, the system obtains the required external data from a third-party system (step 508). The system then proceeds to update the extensible row descriptor (step 510). Finally, the system executes the command issued at the beginning of this process (step 512).

Table Creation

Figure 6:
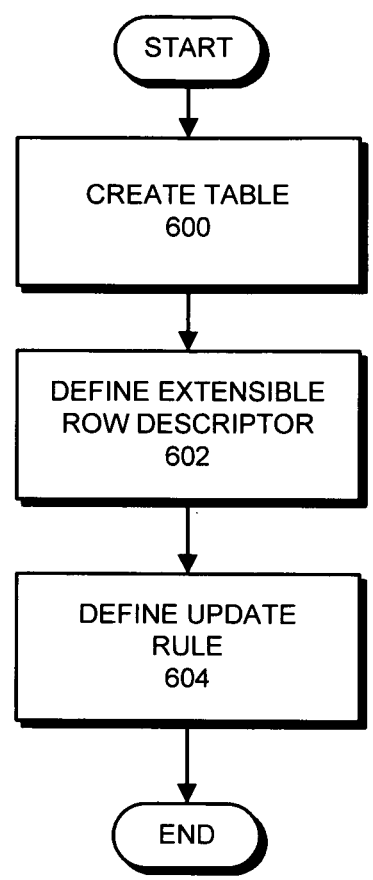
FIG. 6 presents a flowchart illustrating the database table creation process in accordance with an embodiment of the present invention.

FIG. 6 presents a flowchart illustrating the database table creation process in accordance with an embodiment of the present invention. The process begins when a user creates a table (step 600). In doing so, the user defines an extensible row descriptor (step 602). Defining an extensible row descriptor involves defining one or more columns to store meta-data about operations performed on each row.

In one embodiment of the present invention, an administrator or a super-user pre-defines the extensible row descriptor.

After the extensible row descriptor has been defined, the user defines the update rule (step 604). Defining the update rule involves specifying when the extensible row descriptor should be updated, and what information should be stored in the extensible row descriptor.

In one embodiment of the present invention, an administrator or super-user pre-defines the update rule.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
receiving a definition for an extensible row descriptor and an update rule corresponding to a row in a database table, wherein the extensible row descriptor comprises meta-data about operations performed on the row, wherein the update rule specifies:
a field in the row,
information to be stored in the extensible row descriptor, and
a condition for updating the extensible row descriptor, and
wherein the extensible row descriptor and the update rule are incorporated into the table;
using the update rule to determine whether executing a command necessitates updating the extensible row descriptor corresponding to the row; and
responsive to executing the command necessitating updating the extensible row descriptor, updating the extensible row descriptor based on the update rule.

2. The method of claim 1, wherein the extensible row descriptor is retained in the database table after the corresponding row is deleted, thereby allowing information indicating a delete operation to be retained.

3. The method of claim 1, wherein the extensible row descriptor can only be updated by the database, and cannot be modified by a user.

4. The method of claim 1, wherein the update rule is defined by one of:
an owner of the table; or
a super-user.

5. The method of claim 1, wherein the extensible row descriptor can contain any meta-data associated with operations performed on the row that is known by the database, or that can be obtained by the database via communication with a third-party system.

6. The method of claim 1, wherein the operation can include:
an update operation;
an insert operation;
a delete operation; and
a select operation.

7. A non-transitory computer-readable storage medium storing instructions that when executed by a computer cause the computer to perform a method, the method comprising:
receiving a definition for an extensible row descriptor and an update rule corresponding to a row in a database table, wherein the extensible row descriptor comprises meta-data about operations performed on the row, wherein the update rule specifies:
a field in the row,
information to be stored in the extensible row descriptor, and
a condition for updating the extensible row descriptor; and
wherein the extensible row descriptor and the update rule are incorporated into the table;
using the update rule to determine whether executing a command necessitates updating the extensible row descriptor corresponding to the row; and
responsive to executing the command necessitating updating the extensible row descriptor, updating the extensible row descriptor based on the update rule.

8. The non-transitory computer-readable storage medium of claim 7, wherein the extensible row descriptor is retained in the database table after the corresponding row is deleted, thereby allowing information indicating a delete operation to be retained.

9. The non-transitory computer-readable storage medium of claim 7, wherein the extensible row descriptor can only be updated by the database, and cannot be modified by a user.

10. The non-transitory computer-readable storage medium of claim 7, wherein the update rule is defined by one of:

an owner of the table; or a super-user.

11. The non-transitory computer-readable storage medium of claim 7, wherein the extensible row descriptor can contain any meta-data associated with operations performed on the row that is known by the database, or that can be obtained by the database via communication with a third-party system.

12. The non-transitory computer-readable storage medium of claim 7, wherein the operation can include:

an update operation;

an insert operation;

a delete operation; and a select operation.

13. An apparatus that modifies a row in a database table to include meta-data about operations performed on the row, comprising:

a database;

a processor;

a receiving mechanism coupled to the processor to receive definition for an extensible row descriptor and an update rule corresponding to a row in a database table;

wherein the extensible row descriptor meta-data about operations performed on the row, wherein the update rule specifies:

a field in the row, information to be stored in the extensible row descriptor, and a condition for updating the extensible row descriptor; and wherein the extensible row descriptor and the update rule are incorporated into the table;

a determining mechanism coupled to the processor and configured to use the update rule to determine whether executing the command necessitates updating an extensible row descriptor for the row; and an updating mechanism coupled to the processor and configured to update the extensible row descriptor based on the update rule responsive to executing the command necessitating updating the extensible row descriptor.

14. The apparatus of claim 13, further comprising a communication device configured to communicate with a third-party system to obtain meta-data associated with operations performed on the TOW.

15. The apparatus of claim 13 further comprising a checking device configured to check the update rule for an extensible row descriptor to determine if the extensible row descriptor needs to be updated.

16. The apparatus of claim 13, wherein the updating mechanism is configured to ensure that the extensible row descriptor can only be updated by the database, and cannot be updated by a user.

* * * * *

UNITED STATES PATENT AND TRADEMARK OFFICE
CERTIFICATE OF CORRECTION

| | | |
|---|---|---|
| PATENT NO. | : 9,075,831 B2 | Page 1 of 1 |
| APPLICATION NO. | : 11/391033 | |
| DATED | : July 7, 2015 | |
| INVENTOR(S) | : Wong | |

It is certified that error appears in the above-identified patent and that said Letters Patent is hereby corrected as shown below:

In the Claims

In column 8, line 17, in Claim 14, delete "TOW." and insert -- row. --, therefor.

Signed and Sealed this
Twenty-ninth Day of March, 2016

Michelle K. Lee
*Director of the United States Patent and Trademark Office*